US006872370B2

(12) United States Patent
Cooper et al.

(10) Patent No.: US 6,872,370 B2
(45) Date of Patent: Mar. 29, 2005

(54) APPARATUS AND METHODS FOR REMOVING MERCURY FROM FLUID STREAMS

(75) Inventors: John Arthur Cooper, Beaverton, OR (US); Sarah Catherine Fry, Beaverton, OR (US); Bruce Edward Johnsen, Tigard, OR (US)

(73) Assignee: Cooper Environmental Services, Portland, OR (US)

( * ) Notice: Subject to any disclaimer, the term of this patent is extended or adjusted under 35 U.S.C. 154(b) by 440 days.

(21) Appl. No.: 09/962,177

(22) Filed: Sep. 24, 2001

(65) Prior Publication Data

US 2003/0118492 A1 Jun. 26, 2003

(51) Int. Cl.$^7$ .............................. B01J 8/00; B01J 20/22; B01J 20/26
(52) U.S. Cl. ...................... 423/210; 502/401; 502/402; 502/439
(58) Field of Search .......................... 423/210; 502/401, 502/402, 439

(56) References Cited

U.S. PATENT DOCUMENTS

| | | | |
|---|---|---|---|
| 3,194,629 | A | 7/1965 | Dreibelbis et al. |
| 3,956,458 | A | 5/1976 | Anderson |
| 4,419,107 | A | 12/1983 | Roydhouse |
| 4,474,896 | A | 10/1984 | Chao |
| 4,500,327 | A | 2/1985 | Nishino et al. |
| 4,578,256 | A | 3/1986 | Nishino et al. |

FOREIGN PATENT DOCUMENTS

| | | |
|---|---|---|
| EP | 0289809 A1 | 11/1988 |
| GB | 2122916 A | 1/1984 |
| JP | 49-43197 A | 11/1974 |
| JP | 50-6438 A | 3/1975 |

OTHER PUBLICATIONS

J.A. Cooper et al., "Modification of TRC's Hazardous Element Sampling Train for Mercury Speciation in Utility Flue Gas," TRC Environmental Corp., Tigard, Oregon, Electric Power Research Institute, Palo Alto, California, pp. 1–16.
H.Gutberlet et al., "Behaviour of the Trace Element Mercury in Bituminous Coal Furnaces with Flue Gas Cleaning Plants," Media–Data of VGB Kraftwerkstechnik, Jun. 4, 1991.
Björn Hall et al., "Mercury Chemistry in Simulated Flue Gases Related to Waste Incineration Conditions," Environ. Sci. Technol., vol. 24, No. 1, 1990, pp. 108–111.
Nina Bergan French, et al., "State–of–the–Art Mercury CEMs for Hazardous & Mixed Waste Incineration Applications," Environmental Science & Technology and Analytical Chemistry, Feb. 16, 1999, pp. 1–10.
Joseph J. Helble, et al., "Control of Mercury Emissions from Coal–Fired Power Plants, " National Center for Environmental Research, U.S. Environmental Protection Agency, Oct. 31, 2000, http://es.epa.gov/ncerqa–_abstracts/grants/99/enveng/helble.html.
S.E. Lindberg, et al., "Atmospheric Mercury Speciation : Concentrations and Behavior of Reactive Gaseous Mercury in Ambient Air," Environ. Sci. Technol., vol. 32, No. 1, 1998, pp. 49–57.
Patricio E. Trujillo, et al., "Development of a Multistage Air Sampler for Mercury, " Analytical Chemistry, vol. 47, No. 9, Aug. 1975, pp. 1629–1634.
Yoshimi Matsumura, "Adsorption of Mercury Vapor on the Surface of Activated Carbons Modified by Oxidation or Iodization," Atmospheric Environment, vol. 8, pp. 1321–1327.
John A. Cooper, "Recent advances in sampling and analysis of coal–fired power plant emissions for air toxic compounds," Fuel Processing Technology, vol. 39, 1994, pp. 251–258.
S.V. Krishnan, et al., "Sorption of Elemental Mercury by Activated Carbons," Environ. Sci. Technol., 1994, 28, pp. 1506–1512.
Babu R. Nott, et al., "Evaluation and Comparison of Methods for Mercury Measurement in Utility Stack Gas," Elec. Power Res. Inst, Palo Alto, CA, U.S. Environ. Prot. Agen., Research Triangle Park, NC, Radian Corp, Austin, TX, Deeco, Inc., Cary, NC, Frontier Geosciences, Seattle, WA, Mass. Inst. Of Technol., Cambridge, MA, Chester Environ., Tigard OR, pp. 1–15.

*Primary Examiner*—Stanley S. Silverman
*Assistant Examiner*—Jonas N. Strickland
(74) *Attorney, Agent, or Firm*—Glenn C. Brown

(57) ABSTRACT

An apparatus and method for removing mercury, and in particular elemental mercury, from a fluid stream by exposing the fluid stream to a polyethersulfone surface onto which has been loaded elemental iodine. Elemental iodine is loaded onto the polyethersulfone surface by immersing the polyethersulfone substrate in an iodine/ethanol solution, then removing the substrate from the iodine/ethanol solution and rinsing in ethanol.

27 Claims, No Drawings

APPARATUS AND METHODS FOR REMOVING MERCURY FROM FLUID STREAMS

BACKGROUND OF THE INVENTION

This invention relates to the removal of mercury (Hg) from gas streams, and in particular, to an apparatus and method for removing Hg, and in particular, elemental Hg from gas streams.

Mercury is a neurotoxin, which when emitted into the environment is of concern for both the health of man and other components of the biosphere. Even though the concentration of mercury in the atmosphere is low, it can be accumulated in the food chains of man and other species. The degree of environmental availability is dependent in part on the chemical form of mercury. Because of the widely recognized health impacts of this element, it has been identified as a key pollutant to be controlled. Some countries and states have banned the use of mercury in industrial processes, and the use of products containing mercury. As such, reduction of the amount of mercury from sources such as products like batteries and fluorescent light bulbs, and the emission of mercury from sources such as industrial processes, incineration, land fills and boilers is critical.

As mercury emission limits become more stringent, analytical methods capable of detecting ever lower mercury levels are required. In some cases, the required sensitivity exceeds that which can be achieved with known analytical methods. As a result, these measurement methods frequently require pre-concentration of the mercury-containing gas stream prior to analysis in order to measure low concentrations of mercury in typical gas streams.

To further complicate matters, mercury and some of its readily-formed compounds are relatively volatile. For example, mercury readily combines with iodine to form mercuric iodide ($HgI_2$). However, both elemental mercury and mercuric iodide have high vapor pressures at typical ambient and in-stack temperatures. As such, both elemental mercury and mercuric iodide vapor are difficult to remove from a gas stream for emissions control and/or subsequent analysis.

For all of these reasons, removal of mercury from gas streams has been extensively studied, and numerous methods have been reported that purport to effectively remove elemental mercury and mercury compounds from gas streams.

Mercury's propensity to combine with iodine has led to numerous efforts to remove mercury from gas streams by combining the Hg with iodine in some form. For example, Japanese patent JP 49-43197 teaches the removal of mercury from alkali electrolysis cell gas by contacting the gas with an iodide of Li, K, Ca, Mg, Zn, Al, Fe, Ni, or Co, or a compound of the general formula $R_4NI$, where R is H or 1–4C alkyl containing no free $I_2$, and which also includes at least one inorganic reducing agent. The carrier is carbon, a zeolite or silica gel.

JP 50-6438 teaches removal of Hg from gas streams by contacting the gas stream with a cationic exchange resin on which is adsorbed an iodide of Al, Zn, Sr, Fe, Na, Ni, Mg, Li, TEA, methylene, naphthalene, o-phenol or benzene. Iodine is optionally loaded onto the resin in addition to the iodide compound.

U.S. Pat. No. 4,474,896 discloses an absorbent for mercury that is a polysulfide-containing adsorbent composition. In one embodiment, the adsorbent is a zeolite that has been treated to contain metal cation capable of forming insoluble polysulfides when exposed to sulfanes in either vapor form or in an organic solution.

While each of these methods is somewhat successful in removing Hg from gas streams, none is capable of doing so quantitatively, i.e. down to Hg detection levels. As a result, none of these known methods are suitable for Hg removal to the levels required for either thoroughly removing Hg from a process or waste gas stream, for control of emissions, or for quantitative analysis of mercury-containing vapors in a gas stream.

SUMMARY OF THE INVENTION

It is therefore an object of this invention to provide a composition and method capable of removing mercury vapor from a gas stream.

It is another object of the invention to provide a composition and method to remove volatile mercury-containing compounds from a gas stream.

It is yet another object of the invention to provide a composition and method of removing volatile mercury and mercury-containing compounds from a gas stream in a quantitative manner.

It is still another object of the invention to provide a composition and method of removing all mercury species from a gas stream, including elemental mercury vapor and volatile and particulate mercury-containing compounds, in particular compounds containing oxidized mercury.

These and other objects of the invention are met by preferred embodiments of the invention in which a polyethersulfone (PES) substrate is provided, and onto which elemental iodine is loaded.

DETAILED DESCRIPTION OF THE INVENTION

The present invention is embodied in a composition including a polyethersulfone (PES) surface onto which has been loaded elemental iodine, methods for loading elemental iodine onto a PES surface for use in removing mercury from a fluid stream, and methods of collecting mercury in a fluid stream and immobilizing the mercury on a PES surface. In one preferred embodiment, the iodine is loaded onto the PES substrate by treating the substrate with a solution of iodine and ethanol, then rinsing and drying the PES substrate. It has been discovered that a PES surface thus treated will remove over 99% of the mercury from a gas stream under certain conditions. The invention has utility in many areas since it can be used to treat a process gas stream, a discharge gas stream prior to discharging it to the environment, to pre-concentrate the mercury in a gas stream for subsequent analysis, or to determine the chemical and/or physical form of mercury in a gas stream.

In one preferred embodiment, a polyethersulfone filter paper, such as Pall Gelman SB6407, is immersed in a 0.08M solution of iodine in anhydrous, denatured alcohol. To form the treating solution, iodine is dissolved in the ethanol at a rate of 2 grams of iodine per 100 ml of anhydrous, denatured alcohol. The filter material is immersed in the solution until saturated with the solution. In this embodiment, immersion for 3–5 seconds is sufficient; in other embodiments using other forms of filter material, different immersion times might be required to ensure saturation of the filter matrix and exposure of the entire surface of the filter material to the treating solution. The filter material is then removed from the treating solution and rinsed in anhydrous, denatured alcohol, and then dried, in this case air-dried for one hour. The filter material is then ready for use by being exposed to the mercury-containing gas stream. The invention is not intended to be limited to any particular form of filtering material. For example, other embodiments include PES filter tapes, woven materials, fibrous mats, solid sheets, porous solids, membranes, and powders.

While the precise mechanism by which the PES and iodine interact is not known at this time, it is believed that the invention results in elemental iodine being held on a substrate in such a way that when the treated substrate is placed in a gas stream containing mercury (particulate, oxidized vapor and elemental vapor), the mercury reacts with the bound iodide. In this application the term "chemisorbed" is used to describe the attachment of iodine to the PES surface. The term is used to indicate that iodine is held or bonded to the PES surface such that it is not removed by rinsing the substrate in ethanol, in which iodine is soluble. Chemisorbed is not intended to be interpreted in an overly restrictive manner to indicate any specific reaction or bonding strength to the surface. The reaction product, which is believed to be mercuric iodide, remains bound to the PES-I substrate, thereby removing and immobilizing the previously vapor phase mercury.

The following table demonstrates the effectiveness of a filter paper treated according to the foregoing method, and compares the method and filter of the present invention with other materials, and with untreated PES material. In each case, the filter material was exposed to gas streams of about 3 l/min/cm$^2$ in which elemental mercury vapor concentration varied between 35 and 255 micrograms per cubic meter.

TABLE 1

| Material | Treatment | Trapping Efficiency | Hg Exposure Time (min) | Temp. |
|---|---|---|---|---|
| 1. Pall Gelman PES | untreated | 0% | 20 min. | 153° F. |
| 2. Pall Gelman PES | Sat'd I$_2$/H$_2$O | 95% | 10 min. | 159° F. |
| 3. Glass Microfiber | 0.8M I$_2$/EtOH | 7% | 15 min. | 164° F. |
| 4. Cellulose Fiber | 0.8M I$_2$/EtOH | 55% | 10 min. | 68° F. |
| 5. Pall Gelman PES | 0.8M I$_2$/EtOH | 95% | 15 min. | 162° F. |
| 6. MSI PES | 0.8M I$_2$/EtOH | 99% | 10 min. | 68° F. |
| 7. Pall Gelman PES | 0.08M I$_2$/EtOH | 99% | 15 min. | 68° F. |

Referring to line 1 of Table 1, untreated Gelman PES filter paper removed no mercury from the gas stream, while Gelman PES filter paper treated according to the present invention removed 95% of the mercury at about 160° F., and 99% at 68° F. Referring to line 3, glass microfiber treated with 0.8M I$_2$/EtOH removed only 7% of the mercury in the gas stream at 164° F. Referring to line 4, cellulose filter paper (Whatman 41) treated with 0.8M I$_2$/EtOH removed only 55% of the mercury at 68° F. The relatively poor performance of both the cellulose fiber and glass fiber filter elements demonstrates the unexpectedly superior performance of PES materials treated according to the present invention.

The embodiment described is just one embodiment of the invention. The invention can be applied in many different forms depending on the condition or characteristics of the gas stream, the economics of a particular application, and the objectives of the application. For example, the invention can be used in separation processes including any of filtration, diffusion, filtration and diffusion in combination. The invention can also be implemented by injection of PES-I powder into a fluid stream followed by removal of the PES-I powder by filtration, impaction or liquid impingers. The invention is effective for mercury removal at conditions typically associated with coal-fired power plants, gas-fired power plants, incinerators, natural gas purification processes, land fill gas emissions, and many other thermal and chemical processing environments. The methods of the invention can be used for continuous emission monitoring, for intermittent sampling, for removing mercury from a gas stream, for pre-concentration of mercury for analysis, including quantitative analysis. The selectivity of the present invention toward elemental mercury enables the speciation of mercury as well. Several additional embodiments will now be described, each of which utilizes the invention for removing vapor-phase mercury.

In one preferred embodiment that is particularly well-suited for continuous emission monitoring, the filter material is in the form of a tape. The tape is intermittently advanced and a fresh "frame" of the tape is exposed to the gas stream. After exposure to the gas stream, the "frame" of the filter tape material is transferred to an analytical chamber where the amount of mercury on the tape is determined. This information is then stored or transmitted for determination of compliance with regulatory standards, or for use in process control.

In another embodiment, a gas stream containing oxidized mercury particulates, oxidized mercury vapor, and elemental vapor-phase mercury is treated to remove the mercury, and at the same time to provide information on mercury speciation. Speciation refers to the process of not only determining the total amount of mercury, but the amounts of mercury in different oxidation states. In this embodiment, the stream is first passed through an inert filter such as a glass fiber filter to remove the particulate oxidized mercury. The stream is then passed through an untreated PES filter to remove the vapor-phase oxidized mercury. The stream is then passed through a PES filter onto which elemental iodine has been loaded as described above. Passing the stream through this filter removes elemental mercury as described above. The filters are then analyzed to determine the amount of mercury collected on each, and the amounts are summed to determine the total mercury in the stream. This method is useful for continuous emission monitoring, for intermittent sampling (such as EPA reference method #29), and for the "Ontario Hydro" method. The method can provide information on total mercury content, and also for mercury speciation.

In another embodiment, a gas stream containing oxidized mercury particulates, oxidized mercury vapor, and elemental vapor-phase mercury is first introduced into a denuder having an untreated PES surface to remove the vapor-phase oxidized mercury. The stream is then introduced through a diffusion denuder having PES surfaces onto which elemental iodine has been loaded according to methods of the present invention, and which remove the elemental mercury vapor. Finally, the stream is passed through an inert filter to remove the mercury particulates. Each denuder and the inert filter are analyzed for the amount of mercury collected on each, which can be summed to provide a total mercury analysis of the stream.

The foregoing embodiments are intended as illustrative of certain embodiments of the invention, and are not intended to be limiting. Those skilled in the art will recognize that additional sampling, analytical and gas cleaning methods that embody the present invention are possible.

What is claimed is:

1. An apparatus for removing mercury from a gas stream, the apparatus comprising:

a polyethersulfone surface; and, elemental iodine disposed thereon.

2. A method of removing mercury vapor from a gas stream comprising the steps of:

providing a polyethersulfone surface;

loading elemental iodine onto the polyethersulfone surface; and, contacting the iodine-loaded polyethersulfone surface with a gas stream containing vapor-phase mercury.

3. A method according to claim 2 wherein the step of loading iodine onto the polyethersulfone surface includes the steps of:

dissolving elemental iodine in an alcohol; and, applying the alcohol/iodine solution to the polyethersulfone surface.

4. A method according to claim 3 wherein the step of dissolving elemental iodine in an alcohol includes dissolving elemental iodine in ethanol.

5. A method according to claim 4 wherein the step of dissolving elemental iodine in ethanol comprises dissolving elemental iodine in ethanol at a ratio of at least 0.001 moles per liter.

6. A method according to claim 4 wherein the step of dissolving elemental iodine in ethanol comprises dissolving elemental iodine in ethanol at a ratio of at least 0.01 moles per liter.

7. A method according to claim 4 wherein the step of dissolving elemental iodine in ethanol comprises dissolving elemental iodine in ethanol at a ratio of between 0.05 and 0.10 moles per liter.

8. A method according to claim 4 wherein the step of dissolving elemental iodine in ethanol comprises dissolving elemental iodine in ethanol at a ratio of about 0.08 moles per liter.

9. A method according to claim 4 wherein the step of loading iodine onto the polyethersulfone filtering substrate includes the step of removing the polyethersulfone substrate from the ethanol and iodine solution and rinsing the polyethersulfone substrate in ethanol.

10. A method according to claim 2 wherein the step of loading iodine onto the polyethersulfone surface includes chemisorbing elemental iodine thereon.

11. A method according to claim 2 wherein the temperature of the gas stream is up to about 300° F.

12. A method according to claim 2 wherein the step of providing a polyethersulfone surface comprises providing a substrate having a polyethersulfone surface and selected from the group consisting of a a woven material, a fibrous mat, a porous solid, a non-porous solid, and a finely divided solid.

13. A method according to claim 2 wherein the at least one polyethersulfone surface comprises a plurality of polyethersulfone surfaces defining passageways through which flows the gas stream containing elemental mercury.

14. A method according to claim 2 which further comprises:

a filter chamber;

a filter support mounted in the filter chamber;

the filter mounted on the filter support; and, an inlet conduit and an exhaust conduit in communication with the filter chamber.

15. A method according to claim 2 wherein the elemental mercury in the gas stream is a vapor.

16. A method according to claim 2 wherein the method of removing elemental mercury from a gas stream comprises a method of analyzing the gas stream to determine the amount of elemental mercury in the gas stream.

17. A method according to claim 2 wherein the step of providing a polyethersulfone surface comprises providing a substrate having a polyethersulfone surface and selected from the group consisting of a filter paper, a filter tape, and a membrane.

18. A method of analyzing mercury in a gas stream comprising the steps of:

providing a mercury containing gas stream;

extracting a portion of the gas stream;

passing the extracted portion through a filter train, the filter train comprising a first filter for extracting particulate oxidized mercury, a second filter for extracting oxidized vapor phase mercury, and a third filter for extracting elemental vapor phase mercury; and, the third filter comprising a gas permeable polyethersulfone substrate having elemental iodine disposed on the surface of the substrate.

19. A method according to claim 18 wherein the elemental iodine disposed on the surface of the gas permeable polyethersulfone substrate is chemisorbed thereon.

20. A method according to claim 19 wherein the iodine/ethanol has a ratio of at least 0.01 moles per liter.

21. A method according to claim 19 wherein the iodine/ethanol has a ratio of between 0.05 and 0.10 moles per liter.

22. A method according to claim 19 wherein the iodine/ethanol has a ratio of about 0.08 moles per liter.

23. A method according to claim 19 wherein the iodine/ethanol has a ratio of at least 0.001 moles per liter.

24. A method according to claim 19 wherein the iodine/ethanol has a ratio of at least 0.01 moles per liter.

25. A method according to claim 19 wherein the iodine/ethanol has a ratio of between 0.05 and 0.10 moles per liter.

26. A method according to claim 19 wherein the iodine/ethanol has a ratio of about 0.08 moles per liter.

27. A method according to claim 18 wherein the gas permeable polyethersulfone substrate having elemental iodine disposed on the surface of the substrate is formed by immersing the polyethersulfone filtering substrate in an ethanol/iodine solution.

* * * * *